United States Patent [19]

Namba et al.

[11] 4,412,231

[45] Oct. 25, 1983

[54] LIGHT RECORDING MEDIUM

[75] Inventors: Kenryo Namba; Akihiko Kuroiwa; Shiro Nakagawa, all of Tokyo, Japan

[73] Assignee: TDK Electronics Co., Ltd., Tokyo, Japan

[21] Appl. No.: 362,652

[22] Filed: Mar. 29, 1982

[30] Foreign Application Priority Data

Sep. 28, 1981 [JP] Japan .............................. 56-152126

[51] Int. Cl.$^3$ ............................................ G01D 15/34
[52] U.S. Cl. ................................................. 346/135.1
[58] Field of Search ................... 346/1.1, 135.1, 76 L, 346/137; 358/297; 428/156, 913; 430/945

[56] References Cited

U.S. PATENT DOCUMENTS

| | | | |
|---|---|---|---|
| 3,475,760 | 10/1969 | Carlson | 346/1.1 |
| 4,270,130 | 5/1981 | Houle et al. | 346/1.1 X |
| 4,300,143 | 11/1981 | Bell et al. | 346/135.1 |
| 4,336,323 | 6/1982 | Winslow | 428/913 X |
| 4,379,835 | 4/1983 | Lowrey et al. | 428/913 X |

OTHER PUBLICATIONS

Xerox Corporation–"The role of polymers in optical recording media", Dec. 1980; p. 103.
Drexler Technology Corporation–"DREXON TM optical memory media for laser recording and archival data storage", Dec. 1980, p. 88.

Primary Examiner—Donald A. Griffin
Attorney, Agent, or Firm—Oblon, Fisher, Spivak, McClelland & Maier

[57] ABSTRACT

A light recording medium which has a substrate and a recording layer provided thereon and effects recording of information by selective removal or deformation of the recording layer by laser light, which is characterized by that said recording layer contains an organic dye as a light absorber, said dye is a mixed dye obtained by mixing a plurality of dyes having different light absorbing wavelengths from each other and the recording layer has a light absorptivity of 80% or more at all the wavelengths in the range of 400-900 nm in wavelength.

2 Claims, 7 Drawing Figures

LIGHT RECORDING MEDIUM

BACKGROUND OF THE INVENTION

1. Field of the Invention

This invention relates to the so-called light recording medium which reads information given as a physical deformation on a recording layer.

2. Description of the Prior Art

What have heretofore been employed as media for recording information are magnetic recording media, but they have several disadvantages, for example, the information recording density is limited, there is also a limitation on improvement of noise characteristics, the medium is not free from abrasion since it is used in the state where the medium is in intimate contact with a head, and so forth. For that reason, light recording media have recently come to attract attention as the substitute for the magnetic recording media.

Among the light recording media, the so-called head mode recording has a fundamental constitution of a recording layer to which a physical deformation is imparted by irradiated light and a substrate for supporting said recording layer. On recording information coherent light such as laser light is irradiated to melt or burn the medium to provide a small hole thereon, and recording of information is effected by the presence or absence of said small hole.

As materials for the recording layers used in the prior art heat mode recording, tellurium, tellurium-selenium-arsenic compounds, mixtures of nitrocellulose and light absorbers, etc. are known. In the case of each of the above-described materials, the record is permanent and hence erasing and rewriting of the record are not possible, and as media which permit erasing and rewriting of records, there have been proposed in Japanese Patent Application No. 56-51160 styrene-based low polymers (e.g. styrene oligomer) and organic polymers such as nylon, ABS resins etc. which effect recording by a thermal deformation of a recording layer.

Of such constituent materials from the recording layers, those utilizing organic dyes as light absorbers have advantages that they are non-toxious to human beings and that they permit enlargement of the surface area of a recording layer, such advantages having not been achieved with the metal-based recording layers, and further their low cost also makes them easily usable as recording materials from a costwise aspect. On the other hand, each organic dye, while having such merits, has a nature to manifest good absorptivity only against certain light wavelengths, and therefore on use thereof, it is necessary and hence troublesome to change the kind of the contained dye according to the kind of the laser light source. In other words, since the wavelength of a helium-neon laser is 633 nm, an argon laser 515 nm and 488 nm, a helium-cadmium laser 442 nm and 325 nm, and a semiconductor laser 830 nm, 780 nm and 750 nm, it is necessary to constitute a recording layer according to the laser light source used. Especially with the semiconductor laser, since the current situation is such that their wavelengths are being made shorter and shorter with the progress of researches and developments, and hence it is difficult to establish a certain wavelength, it poses a grave problem on the constitution of an organic dye-based recording material. As one proposal for solving this problem, it is contemplated to use carbon black which has good absorptivity over the entire wavelengths as a light absorbing material, but carbon black is inadequate to solve this problem because it becomes transparent to a light having a wavelength longer than its particle diameter.

SUMMARY OF THE INVENTION

The present invention has now been achieved based on such an aspect and therefore its object is to provide a light recording medium having uniform light absorptivity over a wide wavelength range, thereby eliminating the complexity in changing recording media according to the change of the laser light source. The characteristics of the present invention for achieving this object reside in a light recording medium which has a substrate and a recording layer provided on said substrate and effects recording of information by selective removal or deformation of the recording layer by laser light, in which light recording medium said recording layer contains an organic dye as a light absorber, said dye is a mixed dye obtained by mixing a plurality of dyes having different light absorbing wavelengths from each other and the recording layer has a light absorptivity of 80% or more at the whole wavelengths in the range of 400–900 nm in wavelength.

DETAILED DESCRIPTION OF THE PREFERRED EMBODIMENTS

Figure 1:
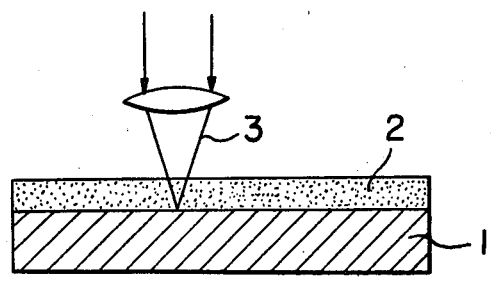
FIG. 1 is an example of a structure of a light recording medium according to the present invention.

FIG. 1 shows an example of a structure of a light recording medium according to the present invention, wherein 1 is a substrate and 2 is a recording layer. The substrate 1 is composed of a synthetic resin or glass, its thickness is e.g. 1.5 mm or so in the case of a disc and 20 $\mu$m or so in the case of a tape, and it supports the recording layer 2 provided on at least one surface thereof. The recording layer 2 incorporates an organic dye as a light absorber in a base material, and more particularly, it also incorporates a surface lubricating material and a deforming agent. As the base material, there may be employed, for example, nitrocellulose, nylon, ABS resins etc. The organic dye as the light absorber is not a single dye but a mixture of dyes having different light absorbing wavelengths from each other. This mixed dye is not of a multi-layered structure of dyes but is a uniform mixture of a plurality of dyes.

The wavelengths of various laser lights are as follows:

| | Wavelength (nm) |
|---|---|
| Semiconductor Laser | 830, 780 & 750 |
| Helium - Neon Laser | 633 |
| Argon Laser | 515 & 488 |
| Helium - Cadmium Laser | 442 & 325 | and thus can be thought to substantially be present in the range of 400–900 nm. And, the light absorptivity varies depending on the organic dye incorporated, and as will be demonstrated by the experimental examples hereinbelow described, when dyes having different wavelengths from each other are mixed, the absorbing characteristics of the mixed dye is the sum of those of the respective dyes. Therefore, by choosing the dyes, it is now possible to provide a recording medium having uniform light absorbing characteristics having no wavelength dependency in the above-described wavelength range.

Dyes for constituting the above mixed dye are desirably those exemplified in Tables I, II and III given below, and they have been experimentally confirmed by the present inventors to be effective as light absorbers.

Table I shows dyes having a maximum light absorbing wavelength in the light wavelength range of 400–590 nm, Table II shows those in 590–750 nm and Table III shows those in 750–900 nm. It should be noted that they do not mean that each dye is chosen from each table to constitute a mixed dye but mean that a plurality of dyes are freely chosen to constitute a mixed dye which satisfies the above-described wavelength range. Further, in order to achieve accurate writing as a light recording medium, it is desirable for it to have a light absorptivity of 80% or more in the above wavelength range. However, since, as a practical problem, the absorptivity can easily fluctuate by e.g. the thickness of the recording layer etc., ±10% is allowed as a variation for absorptivity, that is, a variation of ±10% is given to this 80% as the center. Therefore, on constituting a recording layer, dyes and the number and mixing ratio of the dyes to be mixed are chosen so as to satisfy these requisites. The mixing ratio is determined by the absorptivity coefficients of the chosen dyes.

TABLE I
Light Wavelength of 400–590 nm

| Dye | Maximum Wavelength (nm) |
|---|---|
| Solvent Yellow 114 (Colour Index) | 450 |
| Solvent Yellow 105 (Colour Index) | 450 |
| Solvent Orange 78 (Colour Index) | 450 |
| Solvent Orange 68 (Colour Index) | 480 |
| Solvent Orange 71 (Colour Index) | 500 |
| Solvent Orange 72 (Colour Index) | 440 |
| Solvent Red 176 (Colour Index) | 500 |
| Solvent Red 155 (Colour Index) | 520 |
| 2',7'-Dichlorofluorescein | 512 |
| Rhodamine 110 (Commercial name, produced by Eastman Kodak Co.) | 510 |
| Rhodamine 116 Perchlorate (Commercial name, produced by Eastman Kodak Co.) | 525 |
| Rhodamine 123 (Commercial name, produced by Eastman Kodak Co.) | 511 |
| Solvent Violet 33 (Colour Index) | 580 |
| Solvent Blue 90 (Colour Index) | 590 |
| Oleosol Fast Black BL (Commercial name, produced by Sumitomo Chemical Co.) | 580 |
| Oleosol Fast Red BL (Commercial name, produced by Sumitomo Chemical Co.) | 520 |

TABLE I-continued
Light Wavelength of 400–590 nm

| Dye | Maximum Wavelength (nm) |
|---|---|

TABLE II
Light Wavelength of 590–750 nm

| Dye | Maximum Wavelength (nm) |
|---|---|
| Solvent Blue 83 (Colour Index) | 590 |
| Disperse Blue 5 (Colour Index) | 635 |
| Disperse Blue 6 (Colour Index) | 634 |
| Disperse Blue 7 (Colour Index) | 623 |
| Solvent Blue 36 (Colour Index) | 590 & 640 |
| Solvent Blue 11 (Colour Index) | 608 & 652 |
| Solvent Green 3 (Colour Index) | 640 |
| Solvent Blue 73 (Colour Index) | 620 |
| Solvent Blue 55 (Colour Index) | 610 |
| Solvent Black 22 (Colour Index) | 600 |
| Aizen Spilon Blue GNH (Commercial name, produced by Hodogaya Chemical Co.) | 664 |
| Aizen Spilon Blue 2 BNH (Commercial name, produced by Hodogaya Chemical Co.) | 670 & 630 |
| Solvent Blue 70 (Colour Index) | 675 |
| Oil Color Black BY (Commercial name, produced by Orient Chemical Co.) | 590 |
| Oil Color Black HBB (Commercial name, produced by Orient Chemical Co.) | 600 |
| Oil Color Black #803 (Commercial name, produced by Orient Chemical Co.) | 645 & 595 |
| Oil Color Blue 603 (Commercial name, produced by Orient Chemical Co.) | 635 & 534 |

TABLE III
Light Wavelength of 750–900 nm

| Dye | Maximum Wavelength (nm) |
|---|---|
| IR-140 (Commercial name, produced by Eastman Kodak Co.) | 823 |
| 3,3'-Diethylthiatricarbocyanine perchlorate | 773 |
| 1,1',3,3,3',3'-Hexamethyl-4,4',5,5'-dibenzo-2,2'-indocarbocyanine perchlorate | 782 |
| IR-125 (Commercial name, produced by Eastman Kodak Co.) | 795 |
| NDL-114 (Commercial name, produced by Nippon Kankō Shikiso Co.) | 800 |
| NK-125 (Commercial name, produced by Nippon Kankō Shikiso Co.) | 760 |
| PA-1002 (Commercial name, produced by Mitsui Toatsu Chemicals Inc.) | 895 |
| PA-1003 (Commercial name, produced by Mitsui Toatsu Chemicals Inc.) | 885 |

FIGS. 2–7 set forth the experimental examples for confirming the effectiveness of the above-described light recording medium.

Figure 2:
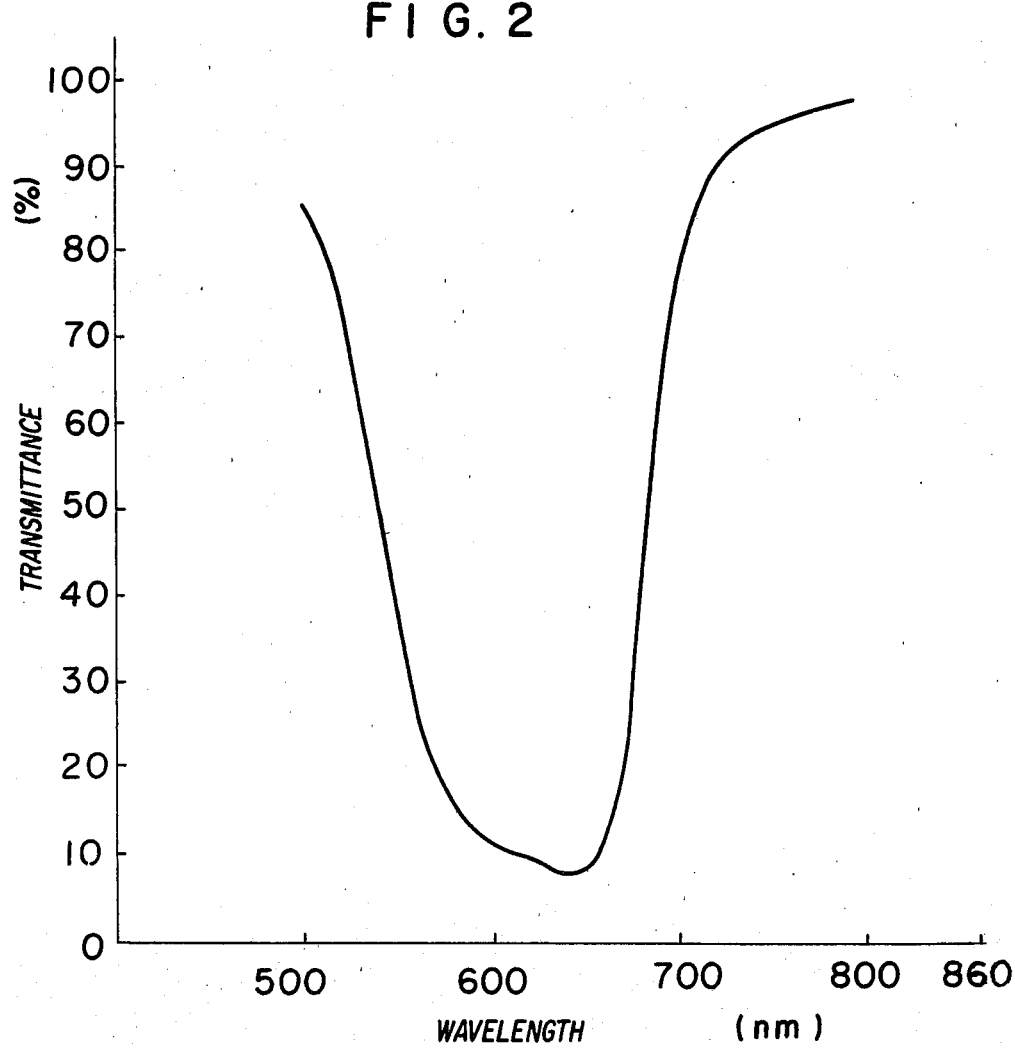
FIG. 2 is an experimental example showing the transmittance of Oil Color Blue 603.

FIG. 2 shows the measured values of the transmittance of Oil Color Blue 603 (commercial name, produced by Orient Chemical Co.) incorporated in nitrocellulose at a ratio by weight of 1:10 against wavelengths. As is clear from the figure, the transmittance reaches the minimum in the vicinity of 640 nm in wavelength.

Figure 3:
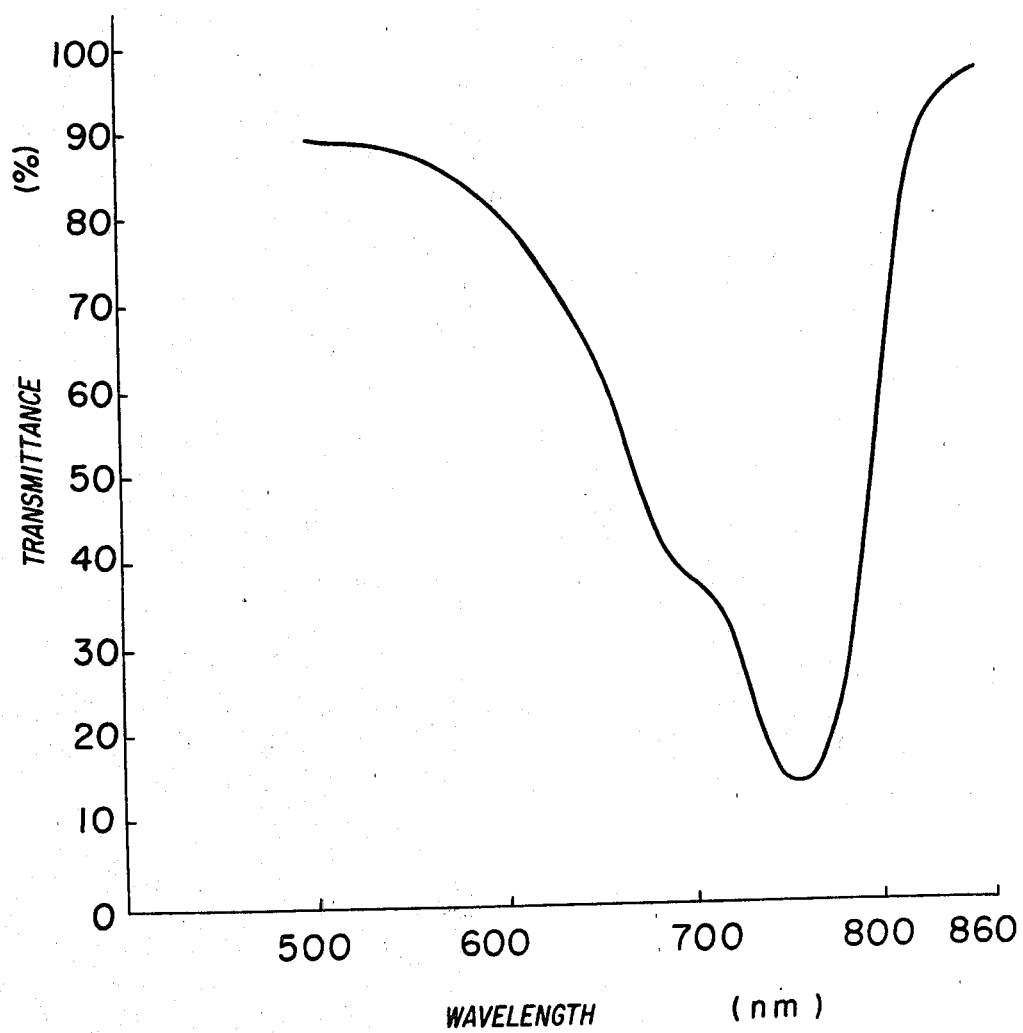
FIG. 3 is an experimental example showing the transmittance of NK-125.

FIG. 3 shows the measured values of the transmittance of NK-125 (commercial name, produced by Nippon Kanko Shikiso Co.) incorporated in nitrocellulose at a ratio by weight of 1:10 against wavelengths. In this case, the transmittance reaches the minimum in the vicinity of 760 nm in wavelength.

Therefore, by mixing Oil Color Blue 603 and NK-125, a mixed dye showing a transmittance having minimum values in the vicinities of 640 nm and 760 nm in wavelength may be obtained. This is shown in FIG. 4.

Figure 4:
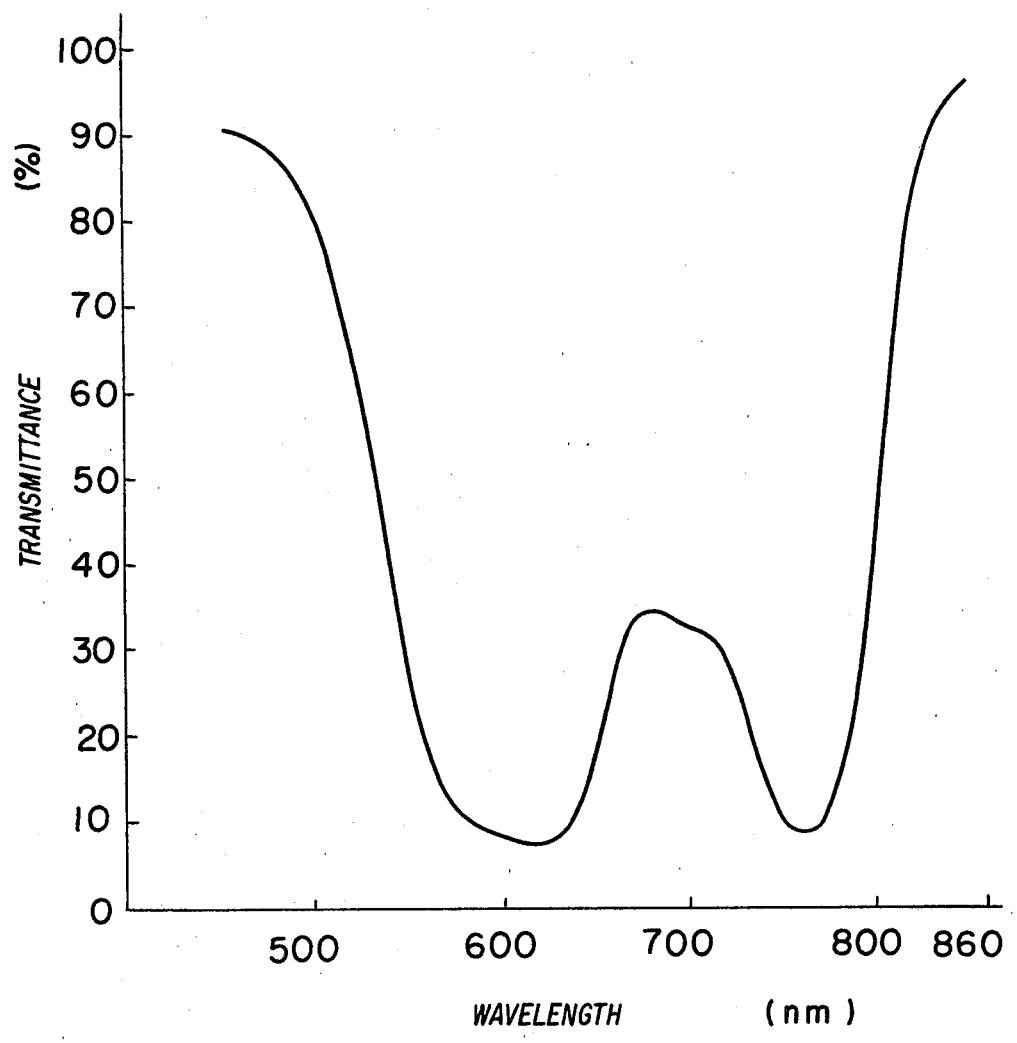
FIG. 4 is an experimental example showing the transmittance of a mixed dye of Oil Color Blue 603 and NK-125.

FIG. 4 shows the transmittance of that obtained by incorporating Oil Color Blue 603 and NK-125 into nitrocellulose at a ratio by weight of 3:1:10. As is clear from the figure, it can be seen that by making the transmittance in the vicinity of 700 nm in wavelength smaller, a flat transmittance over 590–790 nm or so in wavelength will be obtained.

Figure 5:
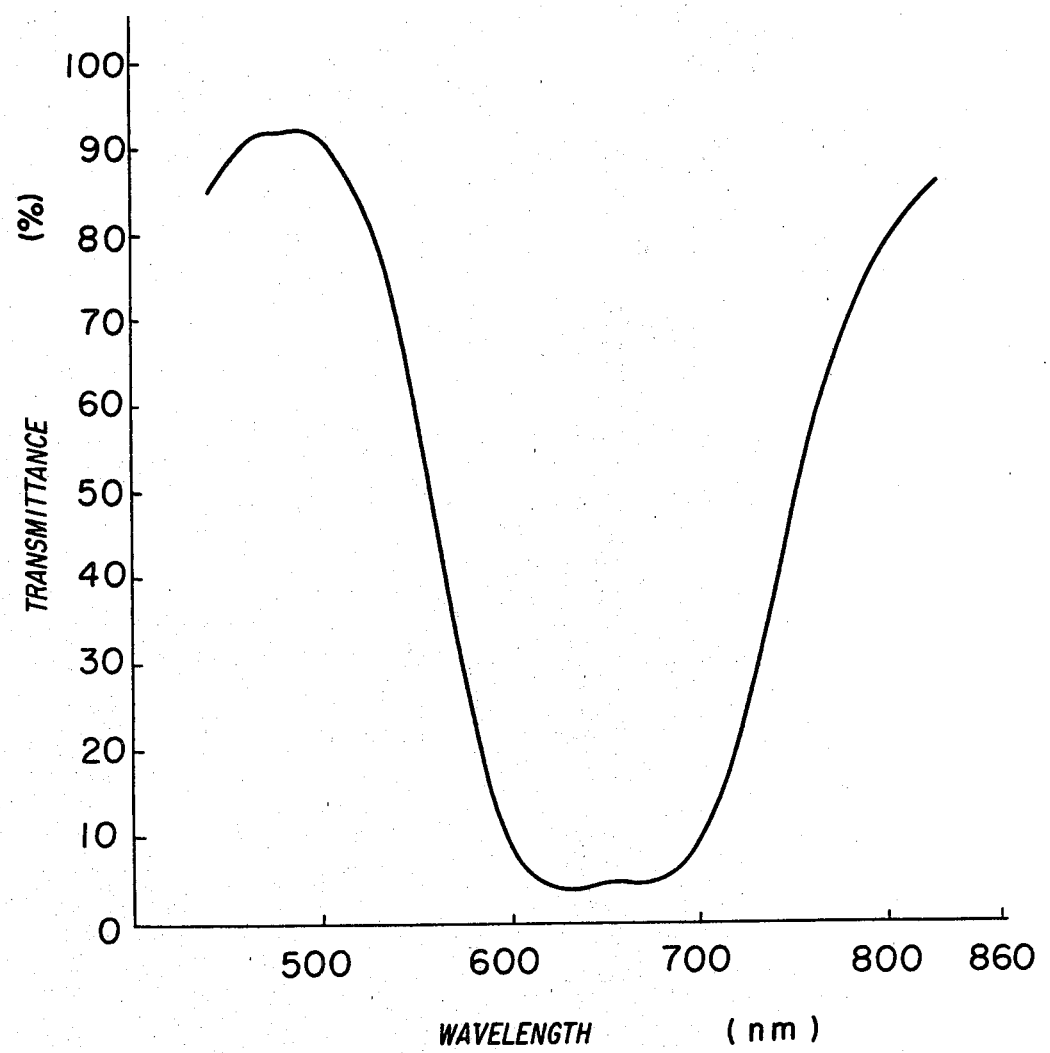
FIG. 5 is an experimental example showing the transmittance of Solvent Blue 70.

FIG. 5 shows the transmittance of Solvent Blue 70 (Oleosol Fast Blue EL) incorporated in nitrocellulose at a ratio by weight of 1:10. Since this dye has a maximum light absorbing wavelength intermediate between those of the above two dyes, the transmittance curve of FIG. 4 is made flat by a mixed dye of these three dyes.

Figure 6:
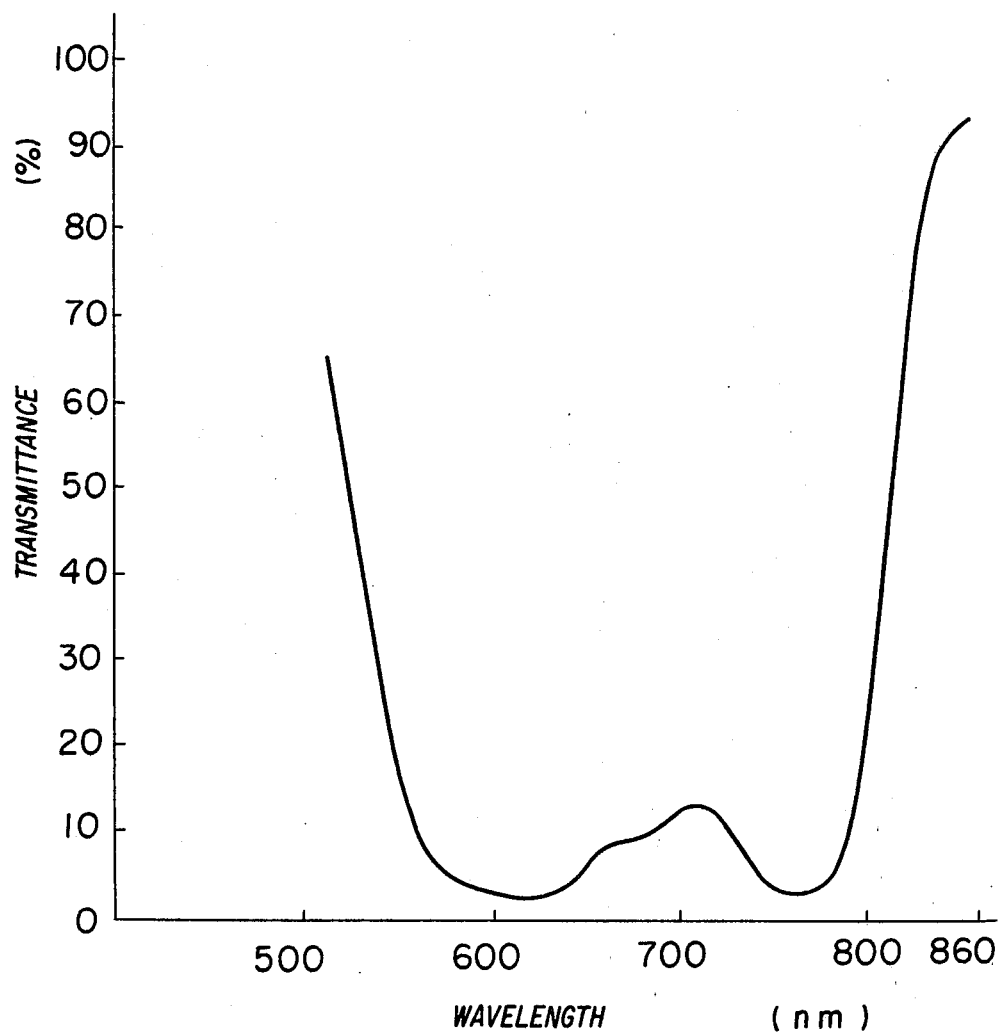
FIG. 6 is an experimental example showing the transmittance of a mixed dye of Oil Color Blue 603, NK-125 and Solvent Blue 70.

FIG. 6 shows the transmittance where Oil Color Blue 603, NK-125 and Solvent Blue 70 are incorporated in nitrocellulose at a ratio of 3:1:1:10. As shown in the figure, it can be seen that a light absorptivity of 80% or more is obtained over 580–800 nm or so in wavelength.

Therefore, it is evident that it is possible to widen the wavelength range by further incorporating other dyes.

Figure 7:
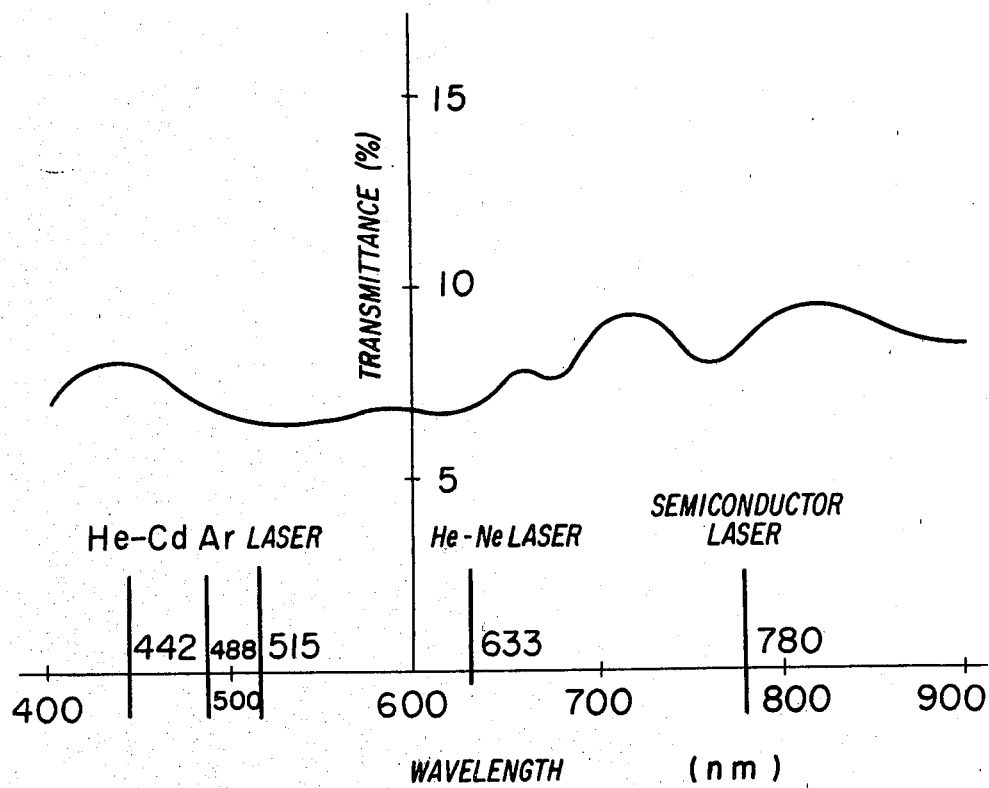
FIG. 7 is an experimental example showing the transmittance of a mixed dye of Oleosol Fast Red BL, Solvent Blue 70, Oil Color Blue 603, NK-125 and PA 1003.

FIG. 7 shows an experimental example in which a medium was constituted so as to be applicable to the wavelengths of the above-described various laser lights and the transmittance of that obtained by incorporating Oleosol Fast Red BL, Oleosol Fast Blue EL, Oil Color Blue 603, NK-125 and PA 1003 into nitro-cellulose at a ratio by weight of 7.5:1:3:1.5:1.5:16.5 was measured. It can be seen that light absorbing characteristics having no wavelength dependency over 400–900 nm in wavelength are obtained.

Therefore, according to the present invention, there may be obtained an organic based light recording medium which can accurately write information and also can accommodate to the progress of the future development of semiconductor lasers.

Further, it is also possible to employ a dye having a high refractive index as at least one among the dyes to be mixed, and by this, the reflectance of the recording layer is controlled, thereby providing a recording medium also excellent in reading information.

As have been described above, according to the present invention, a plurality of dyes having light absorbing wavelengths different from each other are used in a recording layer to give uniform absorbing characteristics over a wide wavelength range, thereby providing an organic based light recording medium which functions effectively for various lasers.

We claim:

1. In a light recording medium which has a substrate and a recording layer provided on said substrate and effects recording of information by selective removal or deformation of the recording layer by laser light, the light recording medium which is characterized by that said recording layer contains an organic dye as a light absorber, said dye is a mixed dye obtained by mixing a plurality of dyes having different light absorbing wavelengths from each other and the recording layer has a light absorptivity of 80% or more at the whole wavelengths in the range of 400–900 nm in wavelength.

2. The light recording medium according to claim 1 wherein the variation of the light absorptivity of said recording layer is within ±10%.

* * * * *